(12) United States Patent
Ichioka et al.

(10) Patent No.: US 8,983,239 B2
(45) Date of Patent: Mar. 17, 2015

(54) OPTICAL CONTROL ELEMENT HAVING A PLURALITY OF OPTICAL CONTROL PORTIONS

(75) Inventors: Masayuki Ichioka, Chiyoda-ku (JP); Masaaki Sudou, Chiyoda-ku (JP); Junichiro Ichikawa, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 13/200,769

(22) Filed: Sep. 30, 2011

(65) Prior Publication Data
US 2012/0087616 A1 Apr. 12, 2012

(30) Foreign Application Priority Data

Sep. 30, 2010 (JP) ................................. 2010-220496

(51) Int. Cl.
*G02F 1/035* (2006.01)
*G02B 6/35* (2006.01)
*G02F 1/313* (2006.01)

(52) U.S. Cl.
CPC ................................. *G02F 1/3137* (2013.01)
USPC ............................................... 385/2; 385/16

(58) Field of Classification Search
CPC ............................. G02F 1/3134; G02F 1/3137
USPC ................................. 385/1–3, 8, 14
See application file for complete search history.

(56) References Cited

U.S. PATENT DOCUMENTS

| 2004/0165246 | A1* | 8/2004 | Carlson et al. ................ 359/245 |
| 2005/0271313 | A1* | 12/2005 | Oikawa et al. ................... 385/3 |
| 2006/0115196 | A1* | 6/2006 | Feke et al. ....................... 385/2 |
| 2008/0226215 | A1* | 9/2008 | Aoki et al. ....................... 385/2 |
| 2009/0067770 | A1* | 3/2009 | Gilardi et al. .................... 385/2 |
| 2009/0263068 | A1 | 10/2009 | Nayyer |
| 2009/0324156 | A1 | 12/2009 | Kinpara et al. |
| 2010/0232736 | A1* | 9/2010 | Ichikawa et al. ................. 385/2 |

FOREIGN PATENT DOCUMENTS

| JP | 6-289341 A | 10/1994 |
| JP | 2006-106365 A | 4/2006 |
| WO | 2007/058366 A1 | 5/2007 |
| WO | WO 2007/114367 A1 | 10/2007 |
| WO | 2008/038778 A1 | 4/2008 |

OTHER PUBLICATIONS

"Coplanar waveguide," Mar. 4, 2006; P-N Design, Inc.*

(Continued)

Primary Examiner — Omar R Rojas
(74) Attorney, Agent, or Firm — Taft Stettinius & Hollister LLP (57) ABSTRACT

An optical control element which has a thin plate having an electro-optical effect and a thickness of 10 μm or less, optical waveguides formed in the thin plate, and a plurality of optical control portions for controlling light propagating through the optical waveguide, wherein, a portion between a plurality of optical control portions is connected by a control signal wiring line that includes any one of a coplanar waveguide type disposed only on a surface of the thin plate, a coplanar waveguide type disposed on the surface of the thin plate and a ground electrode disposed on a back surface thereof, or a micro strip line, for arrival times of light and electric signal set to be substantially the same.

16 Claims, 6 Drawing Sheets

(56) References Cited

OTHER PUBLICATIONS

Nakajima, H., "Electro-Optic Switch for Photonic Network," Technical Report of the Institute of Electronics, Information and Communication Engineers, PS2002-15, 2002-5.

Okayama, H., "Lithium Niobate Electro-Optic Switching," Chapter 2, T. El-Bawab, ed., Optical Switching, Springer, 2006.

Chiba, A., et al., Optical Signal Wavelength Swapping Based on Optical Sideband Generation in Interferometric-Type Optical Switch with Intensity Trimmers, Technical Report of the Institute of Electronics, Information and Communication Engineers, vol. 109, No. 159 (Jul. 2009), pp. 181-184.

* cited by examiner

OPTICAL CONTROL ELEMENT HAVING A PLURALITY OF OPTICAL CONTROL PORTIONS

The present disclosure contains subject matter related to that disclosed in Japanese Priority Patent Application JP 2010-220496 filed in the Japan Patent Office on Sep. 30, 2010, the entire content of which is hereby incorporated by reference.

BACKGROUND OF THE INVENTION

1. Field of the Invention

The present invention relates to an optical control element, particularly, an optical control element in which a thin plate having a thickness of 10 μm or less and having an electro-optical effect is formed with an optical waveguide and a control electrode, and the thin plate is provided with a plurality of optical control portions.

2. Description of Related Art

In technical fields such as a long-distance optical fiber communication, a special optical measurement, or an optical control, an optical switch, particularly, an optical switch (an optical path switching and blocking type) using an electro-optical effect such as lithium niobate (LN) is used. As an optical control element such as an optical switch, an electronic waveguide type optical switch is widely used compared to a mechanical type switch. This is because the waveguide type optical switch has no movable part and is suitable for the increasing the speed of the switching (a switching speed is equal to or less than ns) or the integration. Furthermore, in the related art, many optical waveguide types are suggested which use the electro-optical (EO) effect such as lithium niobate (LN) or the like. In addition, a history of an optical switch using lithium niobate is specifically described in Optical Switching, Springer US, 2006, ISBN978-0-387-26141-6 Chapter 2 and Electro-optic Switch for PhotonicNetwork, H. Nakajima, Technical Report of IEICE, PS2002-15, 2005.

In the development of an ultra high speed optical switch using LN having the lowest dielectric constant and suitable for high speed operation among EO crystal materials, an internal reflection (Total Internal Reflection: TIR) type, a Y-Branch type, and an Asymmetric X-branch type optical switch have previously been suggested which are capable of performing a digital switching and are advantageous for miniaturization. Furthermore, a balanced bridge type, in which a size thereof is large in principle, is disclosed in Technical Report of IEICE vol. 109, No. 159, OPE2009-63, pp. 181-184, July, 2009.

Figure 1A:
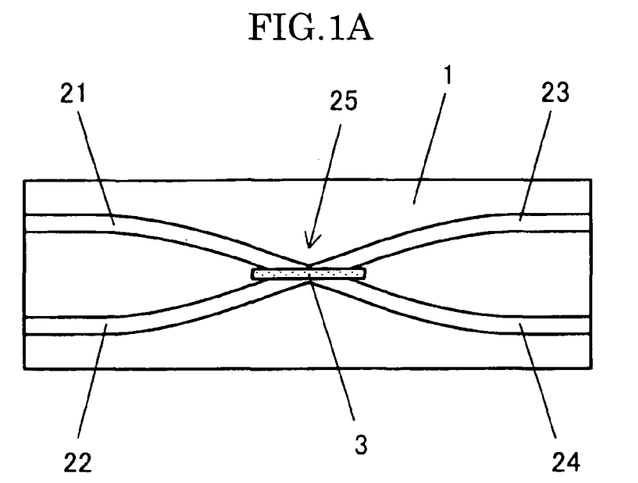
FIG. 1A is a diagram that shows an example of an internal reflection type optical switch.
Figure 1B:
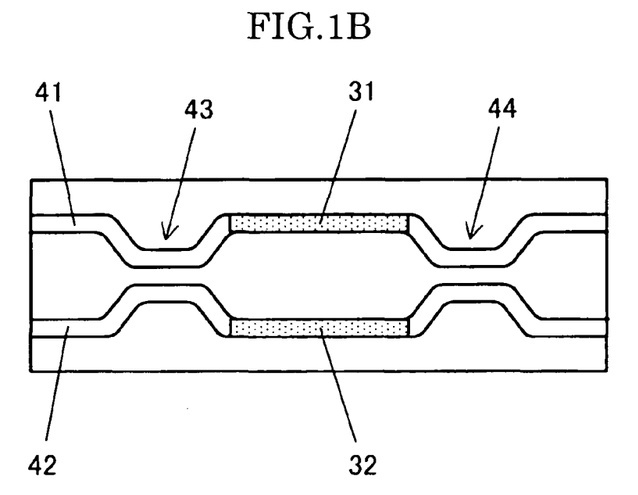
FIG. 1B is a diagram that shows an example of a balance bridge type optical switch.

For example, FIG. 1A is an internal reflection type switch in which crossed-optical waveguides 21 to 24 formed on a substrate 1 are switched by a control electrode 3 disposed in an intersection point 25. FIG. 1B is a balance bridge type switch in which portion 43 and 44 adjacent to two optical waveguides 41 and 42 are provided, a phase of an optical wave propagating through the optical waveguide is adjusted by an electric field to be applied to the electrodes 31 and 32, and an optical waveguide switching of lightwave in the adjacent portion 44 is controlled. In addition, in FIGS. 1A and 1B, the description of a ground electrode constituting the control electrode is omitted.

Figure 2A:
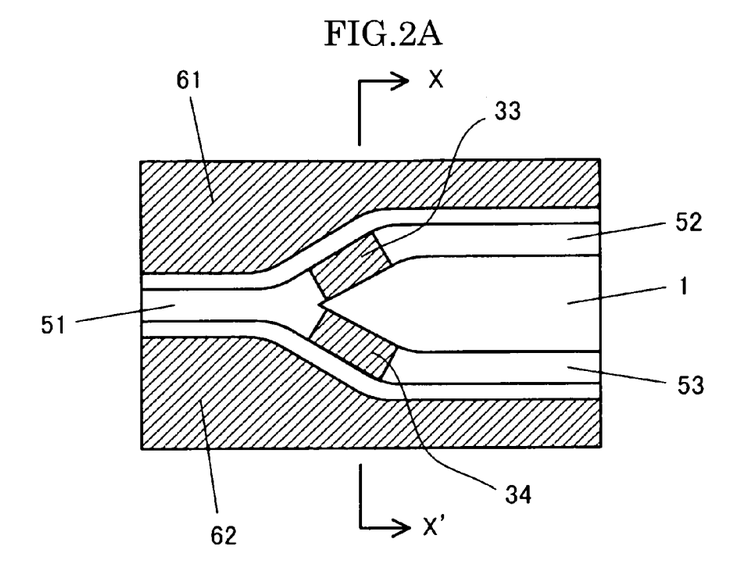
FIG. 2A is a plan view that describes a Y-branch type optical switch.
Figure 2B:
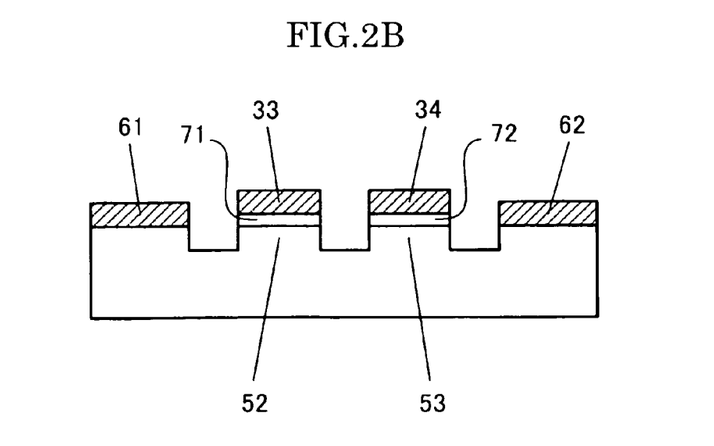
FIG. 2B is a cross-sectional view that describes the Y-branch type optical switch.

In addition, FIGS. 2A and 2B are Y-branch type switch, FIG. 2A is a plan view thereof, and FIG. 2B is a cross-sectional view in X-X' of FIG. 2A. The substrate 1 is formed with ridge type optical waveguides 51 to 53 which constitute the Y-branch type optical waveguide. In the branched optical waveguides 52 and 53, signal electrodes 33 and 34 are formed via buffer layers 71 and 72. Furthermore, ground electrodes 61 and 62 are formed so as to surround the optical waveguides. By adjusting the voltage to be applied to the signal electrodes 33 and 34, in the optical wave incident from the optical waveguide 51, the intensity of the optical wave branched to the optical waveguides 52 and 53 is changed, thereby realizing the function of the optical switch.

The technical development of the optical switch is showing a tendency to stagnate as an overall development trend. The reason is because, when using an optical waveguide configuration or an electrode configuration formed of LN of related art, the driving voltage is too high to obtain a sufficient extinction ratio, whereby it is difficult to obtain the sufficient extinction ratio by an output voltage of a high speed driving circuit of a practical level. In addition, the expression "the extinction ratio is high" has the same meaning as the expression "the crosstalk is low".

Furthermore, as a material having the EO effect higher than LN, there are KTN (potassium tantalate niobate), PLZT (lead lanthanum zirconate titanate), BT (barium titanate) or the like. However, since such materials have very high dielectric constant in the GHz band, in any electrode configuration, an operation at the GHz band or a speed higher than that is made difficult by the operation band limit due to the electrode capacity.

Meanwhile, the applicant disclosed a configuration for dramatically reducing the driving voltage of the LN optical modulator in international publication WO2007/114367. The invention is a technique that can realize speed matching between the microwave and the optical wave or impedance matching of the microwave and can greatly reduce the driving voltage in the optical modulator used in the LN substrate. The reduction in driving voltage has an advantage in that in the miniaturization of the optical waveguide element itself is possible, a low driving voltage type driving device of a low cost can be used, and the like.

SUMMARY OF THE INVENTION

A problem to be solved by the present invention is to provide an optical control element that solves the problem mentioned above, can perform a high-speed driving, and can further reduce the driving voltage.

In order to solve the problem, according to the invention relating to a first aspect, there is provided an optical control element which has a thin plate having an electro-optical effect and a thickness of 10 μm or less, an optical waveguide formed in the thin plate, and a plurality of optical control portions for controlling light propagating through the optical waveguide, wherein, in at least a part of the optical control portions, a control electrode for applying the electric field to the optical waveguide is constituted by a first electrode and a second electrode disposed so as to interpose the thin plate therebetween, the first electrode has a signal electrode and a ground electrode, the second electrode has at least the ground electrode and is configured so as to apply the electric field to the optical waveguide in cooperation with the signal electrode of the first electrode, a portion between a plurality of optical control portions is connected by a control signal wiring line including any one of a coplanar waveguide type disposed only on the surface of the thin plate, a coplanar waveguide type disposed on the surface of the thin plate and a ground electrode disposed on the back surface thereof, or a micro strip line type, for arrival times of light and the electric signal set to be substantially the same.

The coplanar waveguide type (CPW) in the present invention includes a waveguide (a coplanar strip. CPS) in which the signal line and the ground electrode form a pair on a plane, as well as a waveguide in which the signal line is interposed between two ground electrodes on the plane.

Furthermore, the expression "the arrival times are substantially the same" means that the deviation of the arrival times of light and the electric signal reaching each optical control portion is allowed in a range capable of sufficiently achieving the function as the optical control element upon driving the optical control element. For example, the deviation is allowed in the range in which the phase of the control signal (the signal frequency is several GHz to about 300 GHz) is not deviated.

The invention according to a second aspect is configured so that, in the optical control element according to the first aspect, the optical control portion is any one of an optical path switching type optical switch, an optical attenuator, and a Mach-Zehnder type optical modulator.

The invention according to a third aspect is configured so that, in the optical control element according to the first aspect or second aspect, the optical control portion is an electro-optical element that is operated at a switching speed equal to or less than 1 ns or a frequency equal to or greater than 1 GHz.

The invention according to a fourth aspect is configured so that, in the optical control element according to any one of first to third aspects, the thicknesses of the signal electrode and the ground electrode constituting the first electrode are substantially the same.

The expression "thicknesses of the signal electrode and the ground electrode are substantially the same" means that the signal electrode and the ground electrode are formed at the same time, and consequently, the thicknesses of the respective electrodes are the same, and means that a case, where the thicknesses are partially different from each other due to a manufacturing irregularity when simultaneously forming the electrodes, is also included in the allowable range of the present invention.

A fifth aspect is configured so that, in the optical control element according to any one of the first to fourth aspects, the thin plate is any one of $LiNbO_3$ crystal, $LiTaO_3$ crystal, or solid solution crystals of both.

According to the invention relating to the first aspect, an optical control element which has a thin plate having an electro-optical effect and a thickness of 10 μm or less, an optical waveguide formed in the thin plate, and a plurality of optical control portions for controlling light propagating through the optical waveguide, wherein, in at least a part of the optical control portions, a control electrode for applying the electric field to the optical waveguide is constituted by a first electrode and a second electrode disposed so as to interpose the thin plate therebetween, the first electrode has a signal electrode and a ground electrode, the second electrode has at least the ground electrode and is configured so as to apply the electric field to the optical waveguide in cooperation with the signal electrode of the first electrode, a portion between a plurality of optical control portions is connected by a control signal wiring line including any one of a coplanar waveguide type disposed only on the surface of the thin plate, a coplanar waveguide type disposed on the surface of the thin plate and a ground electrode disposed on the back surface thereof, or a micro strip line type, for arrival times of light and the electric signal set to be substantially the same. Thus, it is possible to reduce the driving voltage in the optical control portion by the cooperation of the first electrode and the second electrode, and ensure a degree of freedom of the design relating to the refractive index of the microwave or the impedance setting by the structure according to the control signal wiring line. Therefore, it is possible to supply the control signal in the state in which the losses of the plurality of optical control portions are made low by the control signal wiring line.

According to the invention relating to the second aspect, since the optical control portion is any one of optical path switching type optical switch, an optical attenuator, and a Mach-Zehnder type optical modulator, it is possible to combine each optical control portion and configure an integrated optical control element.

According to the invention relating to the third aspect, when the optical control portion is an electro-optical element that is operated at a switching speed equal to or less than 1 ns or a frequency equal to or greater than 1 GHz, it is possible to easily achieve a reduction in driving voltage, a consistent speed and timing between light and the electric signal suitable for the high-speed driving or the like by adopting the structure of the aspects mentioned above.

According to the invention relating to the fourth aspect, since the thicknesses of the signal electrode and the ground electrode constituting the first electrode are substantially the same, it is possible simultaneously to form two electrodes.

According to the invention relating to the fifth aspect, since the thin plate is any one of $LiNbO_3$ crystal, $LiTaO_3$ crystal, or solid solution crystals of both, the speed matching between light and the electric signal (the micro wave) is easily realized, and since the adjustment of the impedance is also easy, it is possible to provide an optical control element that is capable of performing the high-speed driving.

DETAILED DESCRIPTION OF THE INVENTION

Hereinafter, an optical control element of the present invention will be described.

According to the present invention, there is provided an optical control means which has a thin plate having an electro-optical effect and a thickness of 10 μm or less, an optical waveguide formed in the thin plate, and a plurality of optical control portions for controlling light propagating through the optical waveguide, wherein, in at least a part of the optical control portions, a control electrode for applying the electric field to the optical waveguide is constituted by a first electrode and a second electrode disposed so as to interpose the thin plate therebetween, the first electrode has a signal electrode and a ground electrode, the second electrode has at least the ground electrode and is configured so as to apply the electric field to the optical waveguide in cooperation with the signal electrode of the first electrode, a portion between a plurality of optical control portions is connected by a control signal line including any one of a coplanar waveguide type disposed only on the surface of the thin plate, a coplanar waveguide type disposed on the surface of the thin plate and a ground electrode disposed on the back surface thereof, or a micro strip line type. The portion between the plurality of optical control portions is connected by such control signal wiring line, and so arrival times of light and the electric signal are set to be substantially the same.

Figure 3A:
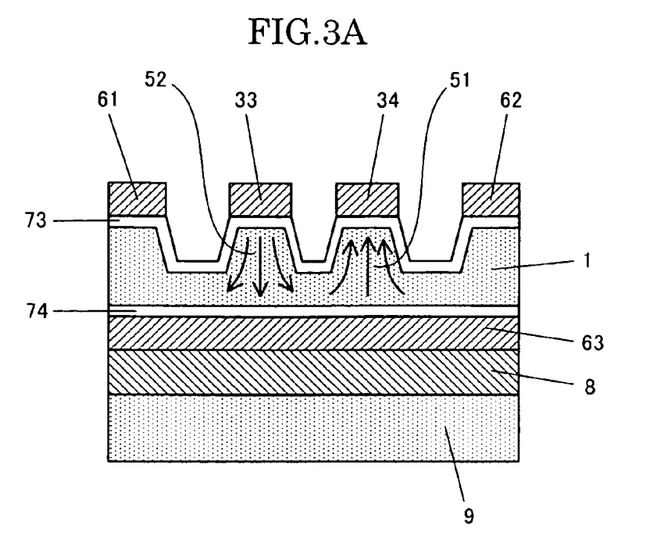
FIG. 3A is a cross-sectional view that describes an optical switch to which a G-CPW electrode structure is applied.
Figure 3B:
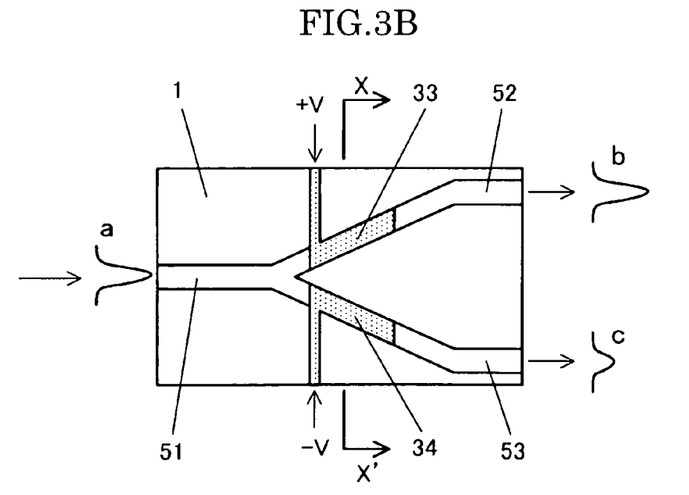
FIG. 3B is a plan view that describes an optical switch to which a G-CPW electrode structure is applied.

FIGS. 3A and 3B are diagrams that describe an example of an optical switch, particularly, a Y-branch type optical switch which is an example of an optical control portion to be applied to the optical control element of the present invention. FIG. 3A shows a cross-sectional view in arrows X-X' of FIG. 3B, and FIG. 3B is a plan view that shows only an optical waveguide portion. Reference numeral 1 is a thin plate having the electro-optical effect and a thickness of 10 μm, and ridge type optical waveguides 51 to 53 are formed in the thin plate. Buffer layers 73 and 74 are provided on an upper surface and a lower surface of the thin plate 1 and play a role in suppressing the absorption of the optical wave to the electrodes that are disposed near the buffer layers.

A control electrode for applying the electric field to the optical waveguides 52 and 53 of the optical switch is constituted by a first electrode and a second electrode that are disposed so as to interpose the thin plate 1 therebetween, and the first electrode is constituted by at least signal electrodes 33 and 34 and ground electrodes 61 and 62. In FIGS. 3A and 3B, there is a coplanar type electrode configuration in which the signal electrode is interposed between the ground electrodes; however, a micro strip line may be adopted in which only the signal electrode is disposed on the thin plate surface, and the ground electrode is disposed on the back surface thereof. The second electrode is configured so that at least the ground electrode 63 is disposed so as to apply the electric field (a solid line arrow in FIGS. 3A and 3B) to the optical waveguides 52 and 53 in cooperation with the signal electrodes 33 and 34 of the first electrode.

In order to reinforce the mechanical strength of the thin plate 1, a reinforcing plate 9 is disposed and fixed on the back surface side of the thin plate 1 via an adhesive layer 8. In order to drive the Y-branch optical switch of FIGS. 3A and 3B, for example, the driving voltage (±V) is applied to the signal electrodes 33 and 34, an optical wave a incident from the optical waveguide 51 is branched from the Y branch portion depending on the application state of the driving voltage, whereby the intensity ratios of output lights b and c to be output are adjusted.

A first characteristic of the present invention is to increase the electric field efficiency to be applied to the optical waveguide and reduce the driving voltage of the optical control portion by constituting the optical waveguides 52 and 53 formed in the thin plate 1 by the first electrode disposed on one surface side of the thin plate and a second electrode disposed on the other surface side, as shown in FIG. 3A. Due to the arrangement of the electrode, the electro-optical (EO) action efficiency is improved, whereby it is possible to reduce the driving voltage of the EO device to about ½ to ¼ of the related art. Furthermore, in the case of a travelling wave electrode in which light and the electric signal are speed-matched with each other, each element can perform the operation in GHz band (the switching speed is equal to or less than 1 ns) and perform in scores of GHz (the switching speed is equal to or less than scores of ps). In addition, as described in international publication WO2007/114367, it is possible to further increase the electric field efficiency ratio by the use of a ridge type waveguide.

Moreover, a second characteristic of the present invention is to form an optical control portion such as an optical switch in a multiple stage manner and promote an improvement in optical characteristic such as an extinction ratio. Of course, it is needless to say that, as a basic element of an waveguide type optical switch, an internal reflection (TIR) type, a Y-branch type, an X-branch type as mentioned above or the like can be used.

Figure 4:
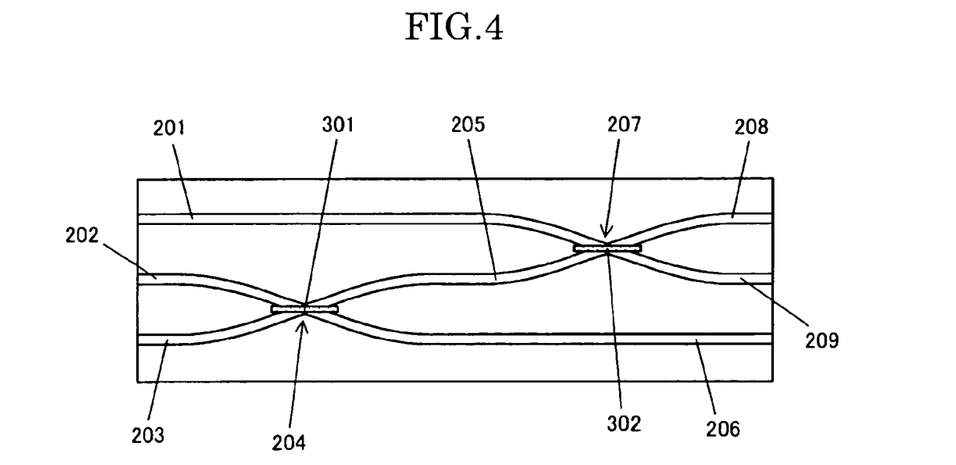
FIG. 4 is a diagram that shows an example of an optical control element in which an optical switch is formed in a multiple stage manner.

For example, as shown in FIG. 4, the TIR type optical switch is configured in two stages. A first optical switch (SW1) is constituted by an intersection portion 204 of the optical waveguide, and a control electrode 301 provided in the intersection portion. A second optical switch (SW2) is constituted by an intersection portion 207 of the optical waveguide, and a control electrode 302 provided in the intersection portion. Reference numerals 201 to 209 are optical waveguides, and the optical waveguide 205 is connected to two optical switches. In addition, in FIG. 4, the description of the ground electrode constituting the control electrode is omitted. The same is also true for FIGS. 5 and 6.

In general, a digital type optical switch using the electro-optical effect is not subjected to a threshold ON/OFF operation, but an optical switching operation is obtained while the extinction ratio is insufficient even in the voltage equal to or less than a proper voltage. Thus, when the voltage of the driving circuit is insufficient, it is a practical selection that the optical control portions are formed in a multiple stage manner to increase the extinction ratio.

The means of using the same functional element in multiple stages in order to improve the extinction ratio of the optical switch is well-known. For example, U.S. Patent Publication No. 2009-263068 indicates a configuration in which a variable light attenuator is connected to a rear end of the optical switch element to realize the high-extinction ratio. Furthermore, the voltage shortage of the driving circuit is supplemented and an element having a poor optical characteristic is used in the multiple stages to obtain a high-extinction ratio.

The restriction (of the performance of the optical switch) generated by introducing the multiple stages of the optical control portion, as shown in FIG. 4 is a synchronization of the electric signal and the optical signal in the respective control portions. For the high frequency operation and the broadband operation of the whole device, there is a need for a suitable delay synchronous driving of the optical control portion of the back stage corresponding to the speed of the signal light. The influence of this problem is greater as the speed is higher. For example, even if the respective optical switches perform the switching operation at high speed, when the synchronizations of the respective optical switches are deviated, the switching speed is effectively delayed, which will cause of occurrences of deficiency of signal, optical attenuation and distortion of the signal immediately before or after the optical path switching.

This problem is resolved by performing the optical path switching operation at exactly the same pattern and timing received by the direction switching operation by the SW1 when the optical signal passing through the first optical switch (SW1) passes through the second optical switch (SW2) of the rear stage. In the solution thereof, a method of preparing a plurality of series of control switches of the same pattern to control each optical switch at the time passing through the SW1 and the SW2 of the optical signal, or dividing the control signal of one pattern into a plurality of signals to control the SW2 of the rear stage via the signal delay line or the like of the suitable delay time is possible in principle.

However, such a method is accompanied by an increase in controlling circuits generating control signals or wiring line patterns or the complexity thereof and is not a practical method. In the configuration of the present invention, the control is performed by connecting the control electrodes of the optical control portion such as front and rear optical switches in series. As the structure of the wiring line electrode between the front and rear optical control portions uses any one of G-CPW (a configuration in which a coplanar waveguide type is formed on the surface of the substrate by a signal line and a ground electrode interposing the same therebetween, and the ground electrode is disposed on the rear surface of the opposite side), CPW (a configuration in which the coplanar waveguide type is disposed only on the surface of the substrate), and a micro strip, or a combination thereof are used. A configuration is desirable in which the line impedance does not change on the wiring line, and in the configuration of the bonding (ridge) waveguide substrate incorporated in the present invention, a degree of design freedom capable of being formed is extremely high, and the requirement above is easily realized.

When forming the G-CPW electrode, the CPW electrode, and the micro strip line electrode in the bonding (ridge) waveguide substrate using the hot electrode of the same width and height, the refractive indices (the microwave refractive indices) to the electric signal (the control signal) are estimated as follows. 1.5<refractive index of CPW<refractive index of G-CPW (about 2)<refractive index of micro strip line<5.

That is, the micro strip line electrode can be used in the wiring line portion requiring a high delay amount, and the CPW electrode can be used in the wiring line portion requiring the preceding amount. Herein, the width or the height of the hot electrode is not regulated by the whole wiring line portions, but may suitably be changed. However, the height of the hot electrode is preferably the same height from the perspective of the cost at which it is possible to carry out forming in a single process in view of a manufacturing process. In the case of the configuration of the present invention, even if the height is regulated, the adjustment of the delay amount and preceding amount of the control signal and the adjustment of the impedance can suitably be designed by the setting of the gap width between the hot electrode and the ground electrodes for the G-CPW and CPW electrode, or by the presence or the absence of an embedding electrode, or by the setting of the hot electrode width.

In general, the wiring line of the CPW electrode, the G-CPW or the micro strip line on the wiring line substrate of the related art greatly differs in the position (the height) where the microwave is propagated, and the loss of the connection is large. For this reason, both the wiring lines are not simultaneously used. That is, the mixed use as another series of signal lines on the same substrate is partially performed, but the mutual direct connection by the same wiring line on the same substrate is not performed.

On the other hand, like the present invention, the low-loss connection of the CPW, the G-CPW, and the micro strip line on the same substrate can be achieved only by using an extremely thin wiring line substrate of 10 μm or less of the substrate materials having the high dielectric constant (non-dielectric constant 28 to 48) like the LN substrate.

In the case of the configuration using the thick substrate of the related art, it is difficult to obtain a refractive index lower than 2, and there is a need to obtain a configuration in which the hot electrode is caused to float from the substrate, or the hot electrode is formed via a thick film having a low dielectric constant.

In the waveguide substrate having no implanted electrode layer in which only a the reinforcement substrate (having a dielectric constant) is bonded to a thin substrate, the degree of freedom of the adjustment of the delay amount preceding amount of the control signal is improved compared to the case of using a thick substrate. However, since the configuration of the micro strip line having high refractive index is not adopted, it is difficult to obtain a high delay amount while maintaining the matching of the impedance. For this reason, there is a need to consider that the electrode is diverted and is folded up so as to obtain the required delay amount.

As described in international publication WO2007/114367, in an optical control element which uses an LN substrate as the reinforcement plate and has the ridge type waveguide and the G-CPW electrode structure, the matching between the speed of light and speed of the microwave is easily obtained. Thus, in the configuration of the simplified two-stages as in FIG. 4, when the control signal wiring line connected between the optical control portions passes through substantially the same path as the optical waveguide, naturally, the timing of the control signal is matched.

In addition, future devices are expected to be highly integrated, and it is expected that a configuration in which the optical waveguide is bent in a U or S shape, a configuration in which the reflection turn-back of the optical waveguide is incorporated, or a multiplexed configuration of three stages or more will be used. Thus, there is a need for a wiring line that realizes the significant delay or the precedence of the control signal. Like the present invention, by using the thin plate and using the suitable combination of the CPW, G-CPW, and the micro strip line as the wiring line between the optical control portions, it is possible to increase the degree of design freedom of microwave speed (the microwave refractive index) and the impedance. The technique of the present invention has a high industrial value, particularly, in the complicated configuration and the highly integrated configuration.

Figure 5:
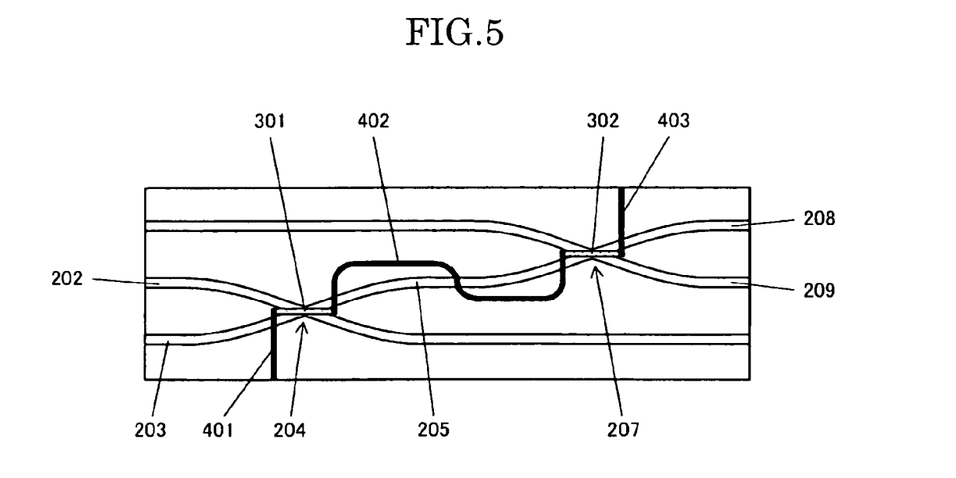
FIG. 5 is a diagram that shows a control electrode wiring line in the optical control element of FIG. 4.

FIG. 5 shows that the wiring line 401, 402 and 403 is specified in the optical control element of FIG. 4. For example, a lithium niobate substrate as a reinforcement substrate may be bonded to the thin plate constituting the optical control element by adhesive. Like the Y-branch type optical switch in FIGS. 3A and 3B, the TIR type optical switch forms the ridge type optical waveguide in the thin plate, and has an electrode arrangement of the G-CPW structure.

By the use of two TIR type optical switches (the control electrodes 301 and 302), when the switch element is one stage, even in the driving by the voltage in which a suitable extinction ratio cannot be obtained, it is possible to obtain the required extinction ratio by the use of two stages. In addition, by providing the wiring line as shown in FIG. 5, the driving circuit is completed in one series, there is no increase in electric power consumption due to the use of two switch elements, and thus, it is possible to perform the driving by the low-driving voltage.

The electrodes of the respective optical switches (SW1 and SW2) constituting the TIR type optical switch have the G-CPW structure (in FIG. 5, the ground electrode of the thin plate surface is omitted, and the ground electrode is formed in a region corresponding to the optical switch on the back surface of the thin plate). However, the portion between the respective optical switches is connected by the CPW electrode (the ground electrode of the thin plate surface is omitted, and the ground electrode is not disposed on the back surface of the thin plate) through the wiring line. In order to avoid that the signal of the wiring line electrode is applied to the optical waveguide and the optical signal is subjected to the phase modulation in the connection between the optical control portions, the optical waveguide and the connection wiring line are formed as separate paths separated beyond the effective range. Thus, by adopting the CPW electrode, the refractive index of the microwave is lowered, and the propagation speed of the microwave is increased further than the propagation speed of the optical wave. As a result, the time required for the control signal from the first optical switch (SW1) to the second optical switch (SW2) is set to be equal to the time required for the optical signal. That is, since the length of the signal electrode 402 of the control signal wiring line is longer than the length of the optical waveguide between the optical control portions of the SW1 and the SW2, there is a need to set the refractive index Nm of the electrode to the microwave smaller than the refractive index No of the optical waveguide to light, whereby the CPW electrode is used in most of the connection wiring lines between the elements. Furthermore, the impedance is set so as to be constant in all of the respective portions of the wiring line.

In the optical control element in which the reinforcement substrate is bonded to the thin plate by adhesive and the thin plate is formed with the ridge type optical waveguide, the containment of light is strong, and the bending loss is small even in a small radius. Thus, it is also possible to obtain a configuration in which the optical waveguide is diverted, and the electrode connection wiring line is designed as short route. In this case, since there is a need to set the refractive index Nm of the electrode to the microwave greater than the refractive index No of the optical waveguide to light, it is possible to use the G-CPW electrode expanded in the gap between the hot electrode and the ground electrode in most of the wiring line connected between the optical connection portions, or use the micro strip line electrode having high refractive index in a part of the wiring line, thereby performing setting so as to obtain a suitable time delay amount.

The thin plate used in the optical control element of the present invention is a crystalline substrate having the electro-optical effect, and, specifically, can use lithium niobate ($LiNbO_3$), lithium tantalite ($LiTaO_3$), PLZT (zirconic acid lead lanthanum titanate), a quartz-based material, and a combination thereof. Particularly, since the electro-optical effect is high, the speed matching between light and the electric signal (the micro wave) is easily realized, and the impedance adjustment is also easy, as the thin plate capable of performing the high speed driving, $LiNbO_3$ crystal, $LiTaO_3$ crystal or solid solution crystal of both are preferably used.

The forming method of the optical waveguide can be formed by diffusing Ti or the like on the substrate surface by the thermal diffusion method, the proton exchange method or the like. Furthermore, like Japanese Unexamined Patent Publication No. 6-289341, it is also possible to form the ridge on the surface of the thin plate according to the shape of the optical waveguide and constitute the optical waveguide.

The control electrode such as the signal electrode or the ground electrode can be formed by the forming of the electrode pattern of Ti—Au, the gold plating method or the like. Furthermore, a transparent electrode can also be used as necessary, ITO, a complex oxide film of In and Ti or the like as an infrared transparent conductive film is used. For the interrogation of the transparent electrode, it is possible to use a method of forming the electrode pattern by a photolithography method and forming by the lift-off method, a method of forming a mask material so that a predetermined electrode pattern remains and forming by a dry etching or a wet etching, or the like.

Each electrode is disposed between the thin plates via a buffer layer such as a $SiO_2$ film. The buffer layer has an effect of preventing that the optical wave propagating through the optical waveguide is absorbed or scattered by the control electrode. Furthermore, as the configuration of the buffer layer, in order to suppress the pyroelectric effect of the thin plate 1 as necessary, the Si film or the like can also be incorporated.

In addition, the buffer layer existing between the ground electrode and the thin plate can also be omitted. However, in regard to the buffer layer existing between the optical waveguide of the thin plate and the ground electrode, as the thickness of the thin plate is thin, a mode diameter of the optical wave propagating through the optical waveguide becomes substantially identical to the thickness of the thin plate. Thus, since the absorption or the scattering of the optical wave due to the second electrode (the ground electrode) formed on the back surface side of the thin plate is also generated, it is desirable that the buffer layer of the portion remains. Furthermore, in order to suppress the influence to the properties of the optical wave propagating through the optical waveguide, the buffer layer can also be disposed in a portion in which the control signal wiring line extends over the optical waveguide.

The manufacturing method of the thin plate including the optical control element is to form the optical waveguide mentioned above on the substrate having the thickness of hundreds of μm, polish the back surface of the substrate, and creates the thin plate having the thickness of 10 μm or less. After that, the control electrode is formed on the surface of the thin plate. Furthermore, after forming the optical waveguide, the control electrode or the like, the back surface of the substrate can also be polished. In addition, since there is a risk that the thin plate may be damaged when subjected to a thermal shock during optical waveguide formation, a mechanical shock due to the handling of the thin film during various processing, or the like. Thus, it is desirable that the process, to which the thermal or mechanical shock is easily added, is performed before polishing the substrate to make the thin plate.

In the supplement substrate to be stuck to the thin plate, various materials can be used, for example, in addition to the use of the material such as the thin plate, it is also possible to use a material such as quartz, glass, and alumina having a dielectric constant lower than that of the thin plate, and use a material having the crystal orientation different from the thin plate. However, it is desirable to select the material having the same line expansion coefficient as that of the thin plate so as to stabilize the fluctuation of the modulation characteristic of the optical control element caused by the temperature change. If it is difficult to select the same material, having the same line expansion coefficient as that of the thin plate should be selected as in the adhesive bonding the thin plate and the reinforcement substrate.

For the bonding of the thin plate and the reinforcement substrate, it is possible to use various bonding materials such as an epoxy-based adhesive, a thermosetting adhesive, an ultraviolet curing adhesive, a solder glass, a thermosetting, light curable, or light curing sheet adhesive.

For the control signal wiring line between the control electrodes or the optical control portions of the optical control portion, the CPW, G-CPW, the micro strip line type is selected. For the adjustment of the impedance or the refractive index, the degree of freedom is high in design such as the hot electrode width, the gap between the hot electrode and the ground electrode, presence or absence of the implanted electrode (the ground electrode disposed on the back surface of the thin plate). Even when any one of the optical waveguide and the connection wiring line is long, it is possible to adjust the arrival times of the optical signal and the control signal with each other while maintaining the height of the electrode of any portion constant. In the case of maintaining the height of the electrode constant, it is possible to simultaneously form the control electrode or the control signal wiring line, whereby the manufacturing process can be simplified.

In the optical control element of the present invention, the reinforcement substrate is bonded to the thin plate formed with the (ridge type) optical waveguide, whereby it is possible to form various electrodes such as the CPW, the G-CPW, and the micro strip line. In addition, in the case of using the thin plate of the high dielectric constant material such as lithium niobate, the electrodes can be connected to each other in a low loss, and there is a characteristic that the degree of freedom of the design of the refractive index of the microwave and the adjustment of the impedance are high. In regard to the degree of freedom of the design of the micro wave, it is essential that the electrode layer such as the ground electrode can be disposed on the back surface of the thin plate.

In addition, the optical waveguide does not need to be a ridge type, but may be a non-ridge type and a slab waveguide. When selecting the optical characteristic such as the efficiency of the electro-optical (EO) acting portion and the bending of the optical waveguide, a suitable waveguide shape can be selected.

FIG. 5 shows an example in which two optical control portions are connected by one control signal wiring line 401, 402 and 403. However, after passing through the optical control portion of the front stage, the control signal wiring line may be branched and a plurality of optical control portions may be connected to the rear stage in parallel. In this case, in order to perform the high speed stable operation, there is a need to suitably set the impedance of the respective branch wiring lines depending on the branching ratio.

Figure 6:
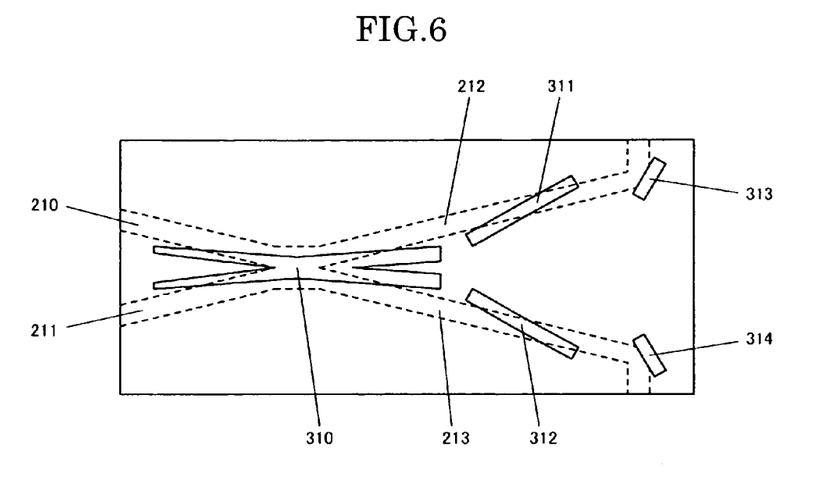
FIG. 6 is a diagram that shows an example of the optical control element in which a plurality of attenuators is disposed in a back stage of the optical switch.

Furthermore, in the embodiment shown in FIG. 5, the optical control portions of the front stage and the rear stage have the same optical element, but the optical element having a different suitable function may be used depending on the required function of the device. FIG. 6 is an example in which an optical switch (an electrode 310) is provided in the optical waveguides 210 to 213 disposed in an X shape and refractive optical attenuators (electrodes 311 and 312) and reflective optical switches (electrodes 313 and 314) are disposed in the rear stage. Even in this case, in order to cause the control signal to arrive according to the time when the optical signal arrives in the respective control portions, the route of the wiring line between the respective optical control portions and the delay precedence time are set.

In case of the TIR type optical switch of the low incident angle or the like, there is a problem regarding the delay of the control signal in the optical control portion according to the shape or the size of the electrode of the optical control portion. This is because, there is a need to broaden the width of the electrode corresponding to the depth of evanescent light in the total reflection portion in the TIR type optical switch, and the microwave refractive index Nm of the thick electrode is increased in the G-CPW structure or the micro strip line structure. In that case, the microwave refractive index Nm of the wiring line electrode between the optical control portions is set to be smaller than the refractive index No of the optical wave of the optical waveguide, and the arrival times in all of the devices are matched.

Figure 7A:
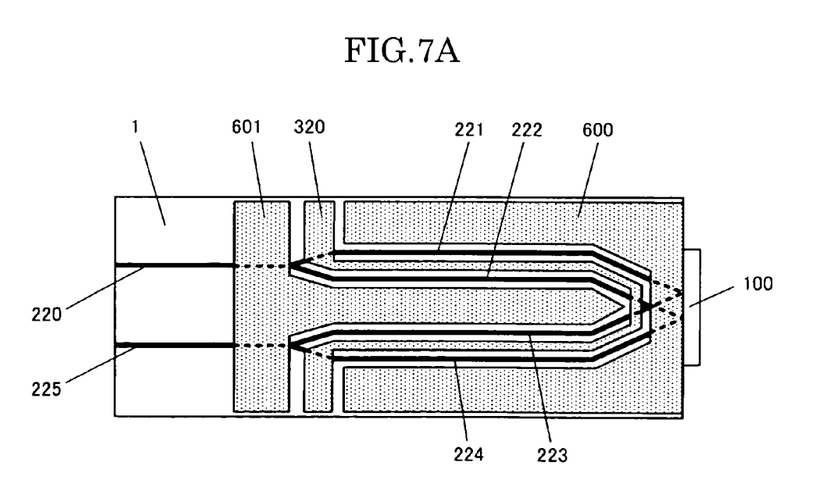
FIG. 7A is an overall plan view that describes an optical control element having a reflection type optical waveguide.
Figure 7B:
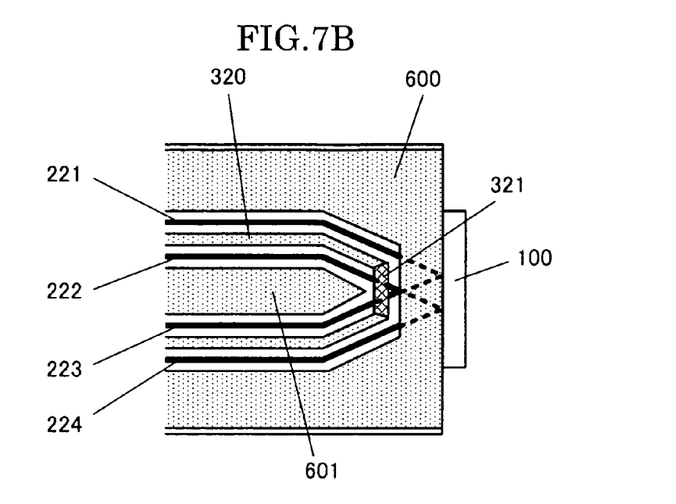
FIGS. 7B and 7C are diagrams that describe a shape of a control electrode near a reflection portion.
Figure 7C:
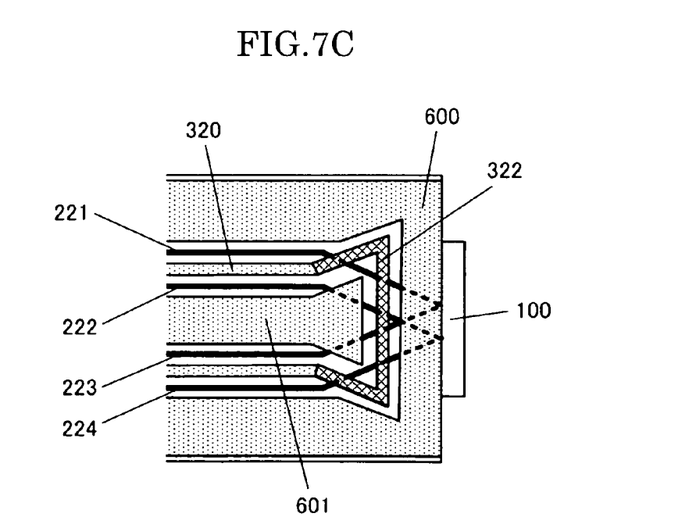

FIGS. 7A to 7C are an example in which the optical control portions of one Mach-Zehnder type optical modulator are dividedly disposed and the control signal wiring line is connected therebetween. In this case, the optical waveguides 220 to 225 constitute a March-Zehnder type waveguide which is folded back by the reflection member 100 disposed on the substrate end surface. The control electrode is constituted by a coplanar type electrode having a signal electrode 320 and ground electrodes 600 and 601, and a ground electrode (not shown) disposed on the back surface of the thin plate 1. FIG. 7B shows a case where the control signal wiring line is folded back to be smaller than the length of the optical waveguide by the fold-back portion of the optical waveguide. In this case, in order to make the refractive index of the control signal wiring line greater than the refractive index of the optical waveguide in regard to the portion indicated by reference numeral 321, for example, it is possible to adjust the delay time by a short wiring line distance using the micro strip line, thereby matching the arrival time difference.

Furthermore, FIG. 7C describes a case where the control signal wiring line is folded back so as to be identical to or longer than the length of the optical waveguide by the fold-back portion of the optical waveguide. In this case, in regard to the portion indicated by reference numeral 322, in order to make the refractive index of the control signal wiring line identical to or smaller than the refractive index of the optical waveguide, for example, it is possible to match the arrival time difference between the optical wave and the microwave using the G-CPW structure or the CPW structure.

In a case where the optical control element of the present invention is applied to the optical switch, it is possible to expect many excellent effects such as a realization of the optical switch of the high speed-broadband, an improvement (reduction) in driving voltage in the optical switch, a reduction in electric power consumption, a reduction in cost of a user by the use of the driving system of low cost, a reduction in size of the device, an improvement in integration in the element, a reduction in cost due to an increase in the device taking number from a wafer due to a reduction in size or the like.

In the optical control element of the present invention, in the optical element, as mentioned above, it is possible to use any one of the optical path switching type optical switch, the optical attenuator, and the Mach-Zehnder type optical modulator. For this reason, it is also possible to combine the respective optical control portions and constitute the integrated optical control element.

Furthermore, in the optical control element of the present invention, in the optical control portion, it is possible to dispose the electro-optical element which is operated at the switching speed of 1 ns or less or at a frequency of 1 GHz or more. Particularly, by forming the multi-stage optical control portion on the thin plate, and adopting the structure such as the CPW, the G-CPW, and the micro strip line in the electrode of the respective optical control portions or the control signal wiring line, it is possible to easily achieve a reduction in driving voltage suitable for the high-speed driving, the coincidence of the speed and the timing of light and the electric signal or the like.

As described above, according to the present invention, it is possible to provide an optical control element that is capable of performing the high-speed driving and can further reduce the driving voltage.

What is claimed is:

1. An optical control element which has a thin plate having an electro-optical effect and a thickness of 10 µm or less, an optical waveguide formed in the thin plate, and a plurality of optical control portions for controlling light propagating through the optical waveguide,
   wherein the thin plate is any one of $LiNbO_3$ crystal, $LiTaO_3$ crystal, or solid solution crystals of both,
   wherein at least two or more of the plurality of optical control portions are connected by the optical waveguide and a control signal wiring line in series,
   wherein, in at least a part of the optical control portions, a control electrode for applying an electric field to the optical waveguide has a G-CPW configuration which is constituted by a first electrode and a second electrode disposed so as to interpose the thin plate therebetween, wherein the first electrode has a signal electrode and a ground electrode, and the second electrode has at least a ground electrode and is configured so as to apply the electric field to the optical waveguide in cooperation with the signal electrode of the first electrode,
   wherein a part of the control signal wiring line, where a length of the signal electrode of the control signal wiring line is larger than a length of the optical waveguide between the optical control portions, and where the optical waveguide and the signal electrode of the control signal wiring line are formed as separate paths separated beyond an effective range so as to avoid that a signal of the signal electrode of the control signal wiring line is applied to the optical waveguide, includes a coplanar waveguide type configuration which is different from the G-CPW configuration, in which a signal electrode and a ground electrode are disposed only on a surface of the thin plate on which the first electrode is disposed, and
   a microwave refractive index of the control signal wiring line having the coplanar waveguide type configuration is set to be less than a microwave refractive index of the control electrode having the G-CPW configuration.

2. The optical control element according to claim 1, wherein the optical control portion is any one of an optical path switching type optical switch, an optical attenuator, and a Mach-Zehnder type optical modulator.

3. The optical control element according to claim 1, wherein the optical control portion is an electro-optical element that is operated at a switching speed equal to or less than 1 ns or at a frequency equal to or greater than 1 GHz.

4. The optical control element according to claim 1, wherein the thicknesses of the signal electrode and the ground electrode constituting the first electrode are substantially the same.

5. The optical control element according to claim 1, wherein a relative dielectric constant of the thin plate is 28 to 48.

6. The optical control element according to claim 2, wherein the optical control portion is an electro-optical element that is operated at a switching speed equal to or less than 1 ns or at a frequency equal to or greater than 1 GHz.

7. The optical control element according to claim 2, wherein the thicknesses of the signal electrode and the ground electrode constituting the first electrode are substantially the same.

8. The optical control element according to claim 3, wherein the thicknesses of the signal electrode and the ground electrode constituting the first electrode are substantially the same.

9. An optical control element which has a thin plate having an electro-optical effect and a thickness of 10 µm or less, an optical waveguide formed in the thin plate, and a plurality of optical control portions for controlling light propagating through the optical waveguide,
   wherein the thin plate is any one of $LiNbO_3$ crystal, $LiTaO_3$ crystal, or solid solution crystals of both,
   wherein at least two or more of the plurality of optical control portions are connected by the optical waveguide and a control signal wiring line in series,
   wherein, in at least a part of the optical control portions, a control electrode for applying an electric field to the optical waveguide has a G-CPW configuration which is constituted by a first electrode and a second electrode disposed so as to interpose the thin plate therebetween, wherein the first electrode has a signal electrode and a ground electrode, and the second electrode has at least a ground electrode and is configured so as to apply the electric field to the optical waveguide in cooperation with the signal electrode of the first electrode,
   wherein a part of the control signal wiring line, where a length of the signal electrode of the control signal wiring line is smaller than a length of the optical waveguide between the optical control portions, and where the optical waveguide and the signal electrode of the control signal wiring line are formed as separate paths separated beyond an effective range so as to avoid that a signal of the signal electrode of the control signal wiring line is applied to the optical waveguide, includes a micro strip line configuration which is different from the G-CPW configuration, in which a signal electrode is disposed on a surface of the thin plate on which the first electrode is disposed and a ground electrode is disposed on a surface of the thin plate on which the second electrode is disposed, and
   wherein a microwave refractive index of the control signal wiring line having the micro strip line configuration is set to be more than a microwave refractive index of the control electrode having the G-CPW configuration.

10. The optical control element according to claim 9, wherein the optical control portion is any one of an optical path switching type optical switch, an optical attenuator, and a Mach-Zehnder type optical modulator.

11. The optical control element according to claim 9, wherein the optical control portion is an electro-optical element that is operated at a switching speed equal to or less than 1 ns or at a frequency equal to or greater than 1 GHz.

12. The optical control element according to claim 9, wherein the thicknesses of the signal electrode and the ground electrode constituting the first electrode are substantially the same.

13. The optical control element according to claim 9, wherein a relative dielectric constant of the thin plate is 28 to 48.

14. The optical control element according to claim 9, wherein the optical waveguide has a fold-back-portion which is folded back by a reflection member, and the optical control portions are disposed in back and forth of the fold-back portion, and
   wherein the optical control portions disposed in back and forth of the fold-back portion are connected by the optical waveguide and the control signal wiring line in series.

15. The optical control element according to claim 1, wherein a microwave refractive index of the control signal wiring line having the coplanar waveguide type configuration is set to be 1.5 or more and 2 or less.

16. The optical control element according to claims 9, wherein a microwave refractive index of the control signal wiring line having the micro strip line configuration is set to be 2 or more and 5 or less.

\* \* \* \* \*